United States Patent [19]
Zoleta

[11] 3,817,043
[45] June 18, 1974

[54] AUTOMOBILE AIR CONDITIONING SYSTEM EMPLOYING THERMOELECTRIC DEVICES

[75] Inventor: Jose C. Zoleta, Elmhurst, N.Y.

[73] Assignee: Petronilo C. Constantino & Associates, Manila, Philippines

[22] Filed: Dec. 7, 1972

[21] Appl. No.: 312,895

[52] U.S. Cl............................................. 62/3, 62/238
[51] Int. Cl............................................. F25b 27/00
[58] Field of Search.................................... 62/3, 238

[56] References Cited
UNITED STATES PATENTS

| | | |
|---|---|---|
| 2,881,594 | 4/1959 | Hopkins............................ 62/3 |
| 2,886,618 | 5/1959 | Goldsmid......................... 62/3 |
| 2,966,033 | 12/1960 | Hugel............................... 62/3 |
| 3,082,276 | 3/1963 | Corry............................. 136/205 |
| 3,138,934 | 7/1964 | Roane.............................. 62/3 |
| 3,302,414 | 2/1967 | Sudmier............................ 62/3 |
| 3,552,133 | 1/1971 | Kukomsky........................ 62/3 |
| 3,602,001 | 8/1971 | Bauer.............................. 62/3 |

Primary Examiner—William J. Wye
Attorney, Agent, or Firm—Watson Leavenworth Kelton & Taggart

[57] ABSTRACT

An automobile air conditioning system is disclosed in which the engine exhaust provides a heat source for operating a Seebeck generator used for supplying electrical current to a Peltier unit located in the passenger space for removing heat from the latter.

2 Claims, 6 Drawing Figures

PATENTED JUN 18 1974  3,817,043

SHEET 1 OF 2

AUTOMOBILE AIR CONDITIONING SYSTEM EMPLOYING THERMOELECTRIC DEVICES

BACKGROUND OF THE INVENTION

The use of air conditioning in automobiles has become fairly commonplace. Generally the air conditioning system for an automobile is provided by means of the well-known vapor compression type system which involves among other things driving the compressor unit with the automobile engine. For this purpose additional engine horsepower must be used and accordingly additional fuel consumed to operate the system. At the same time the conventional automobile operates such that only about 30 percent of the heat liberated by the burning of fuel therein is put to use for work in operating the automobile. The other 70 percent of the heat is lost through the engine cooling and exhaust systems. It is desirable, therefore, that certain of the waste heat normally lost through the exhaust system in conventional manner be employed for the purpose of providing air conditioning in an automobile. Additionally, the compressor type system has the disadvantage that the compressor speed generally varies as the vehicle speed changes. The compressor must have enough capacity to give sufficient cooling at idling speed on the hottest days. With this problem in mind it is very difficult to install a conventional compressor type system in a low engine horsepower vehicle particularly one of 60 brake horsepower and below. Furthermore, the conventional vapor compression type system has the disadvantage of requiring maintenance of components therein which may require replacement after a period of time, and such components require considerable installation space in the engine compartment making it difficult to conveniently effect maintenance of other mechanical units therein.

SUMMARY OF THE PRESENT INVENTION

The present invention relates to air conditioning of automobiles. It is particularly concerned with the employment of a thermoelectric system as a means for converting otherwise wasted heat energy from the engine exhaust system to useful work as a heat pump for air conditioning the passenger space in an automobile. In so doing, it employs the Peltier effect, namely, that if an electric current flows across the junctions between two dissimilar metals or semi-conductor materials, originally at uniform temperature, heat is either absorbed or generated at the junctions depending on the direction of current flow and the nature of the two dissimilar materials.

In accordance with the present invention an automobile having the usual internal combustion engine mounted in an engine compartment of the vehicle and provided with a cooling system for removing heat from the engine during operation which includes a source of water, means for circulating the latter, a radiator component for removing heat from the water, an air blower unit for blowing ambient air across the radiator to remove heat from the water passing therethrough and an engine exhaust system including an exhaust manifold, is provided with an air conditioning system which includes a plurality of Peltier thermoelectric units of semi-conductor P and N type materials and each having two junctions, one junction being disposed within the passenger space and the other junction within the engine compartment. Additionally a Seebeck generator device comprised of a plurality of thermoelectric couples is disposed in the engine compartment and is connected electrically with the Peltier units for supplying a DC current flow to the latter. Further, the Seebeck generator couples are mounted with their hot sides disposed interiorly of a common duct passing through the radiator with the cold sides being disposed exteriorly of said duct. The duct is connected with the engine exhaust manifold for receiving heated products of combustion resulting from burning fuel in the engine during operation of the latter. As a result of the passage of the highly heated products of combustion through the common duct, there is produced in the Seebeck generator device a DC electric potential power which in turn is transmitted to the Peltier thermoelectric units so that the passage of the current therethrough in turn produces a supply or removal of heat from the passenger space depending on the direction of current flow in the thermoelectric couples.

For the purpose of providing, e.g., about one ton of refrigeration in an automobile, and assuming a Figure of Merit of one for the semi-conductor materials used, 180 thermoelectric modules each containing 31 individual thermoelectric couples and manufactured by the Materials Electronic Corporation are required to produce an electric power supply of approximately 4 K.W. to the Peltier thermoelectric units to effect removal or supply of about 12,250 B.T.U.'s per hour from the passenger space.

The present invention has no moving parts, it utilizes waste product heat and adds no additional cost to the operation of the vehicle for the purposes of producing air conditioning in the same. Thus, it eliminates the cost as well as the maintenance associated with conventional type air conditioning systems for automobiles.

The invention, accordingly, comprises the air conditioning system possessing the features, properties and relation of elements which will be exemplified in the system hereinafter described and the scope of the present invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which.

DESCRIPTION OF THE PREFERRED EMBODIMENTS

Figure 1:
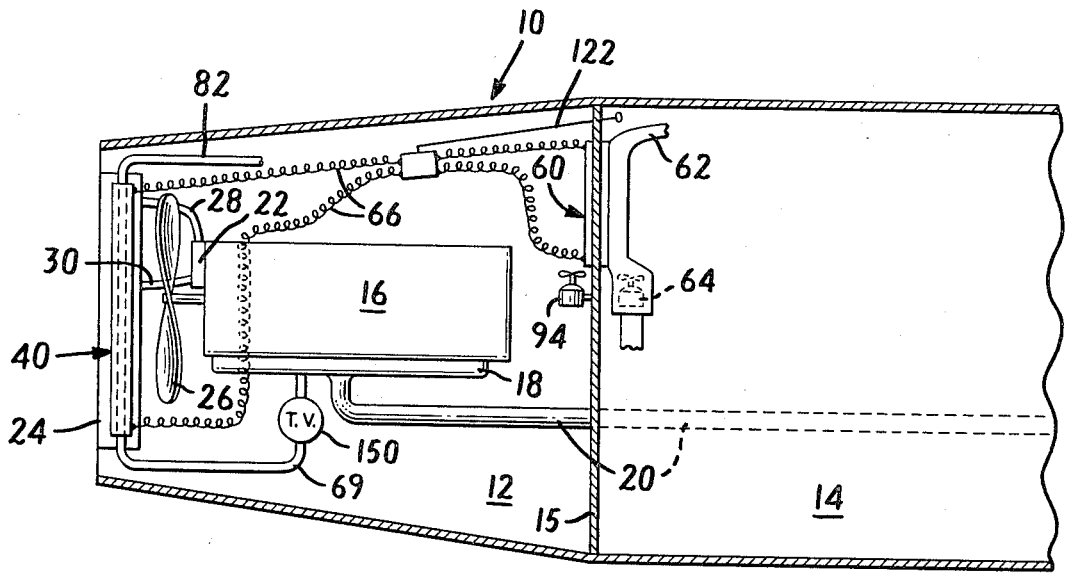
FIG. 1 is a plan view of the front end portion of an automobile, parts thereof being removed and certain parts not being shown and in which is installed the air conditioning system of the present invention.

Referring now to FIG. 1 of the drawings, there is depicted in plan view the front end of an automobile 10 which is provided with an engine compartment 12 and a passenger space 14, the two being separated in conventional manner by a wall partition 15 commonly known as a firewall. Located within the engine compartment is an internal combustion engine 16, e.g., a gasoline or diesel type which is provided with an engine manifold 18 to which is delivered products of combustion resulting from operation of the engine, and an exhaust line 20 connected to the latter and leading to the rear of the vehicle in the usual manner for ultimate exhaust discharge. The engine further is provided with a water pump 22 and a radiator component 24 through which cooling water from the engine is circulated by means of pump 22 to effect cooling of the same there being provided in the usual manner an engine driven fan 26 for facilitating heat exchange in the radiator, the pump being connected with the radiator by the customary water hoses 28 and 30. Mounted within the engine compartment and shown generally at 40 is a Seebeck generator device which will be described in greater detail shortly. The system also includes a Peltier unit shown generally at 60 and mounted in the firewall and having in association therewith duct work 62 and a fan unit 64 for circulating air within the passenger space. The Seebeck generator device 40 and Peltier unit 60 are connected electrically by means of wiring 66 so that a DC current generated in the Seebeck generator device can be transmitted to the Peltier unit 60. As shown more particularly in FIG. 2, the Seebeck generator device includes a housing 80 provided in the fashion of a plenum or duct through which exhaust gases or products of combustion issuing from the engine manifold 18 can be conveyed, there being a conduit 69 connecting the engine manifold with the intake side of the housing with the latter having an outlet conduit 82 for discharge from the housing of spent products of combustion and water at a convenient location.

Figure 2:
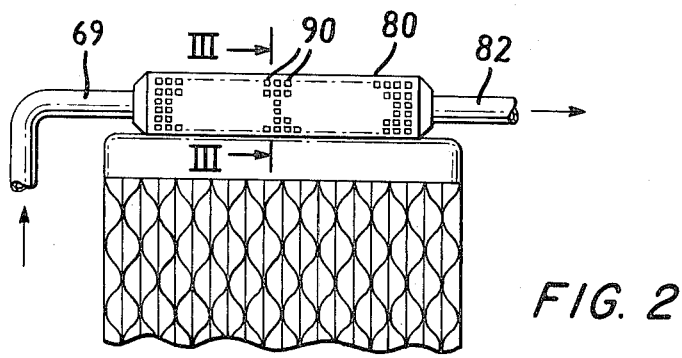
FIG. 2 is a fragmentary elevational view of the automobile radiator showing the Seebeck generator device mounted thereon.
Figure 3:
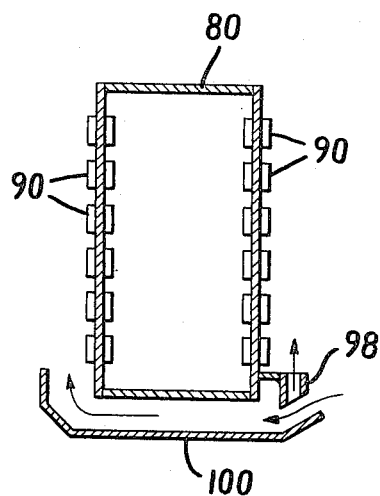
FIG. 3 is a vertical sectional view as taken along the lines III—III in FIG. 2.
Figure 5:
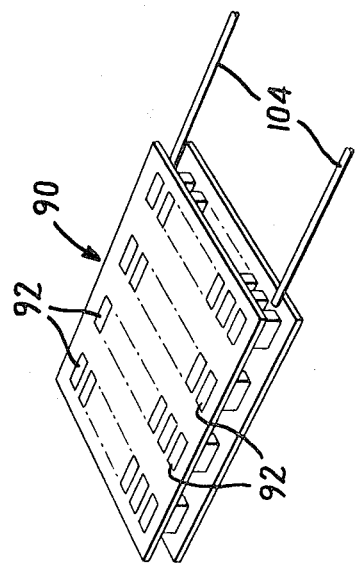
FIG. 5 is a perspective view depicting one of the thermoelectric modules used in the Seebeck generator and Peltier units of the air conditioning system of the present invention.

With reference to FIGS. 2 and 3, the Seebeck generator device 40 is comprised of a plurality of thermoelectric couple units arranged in longitudinal and vertical array, the plurality of units being provided in such number as is required to produce, for example, a power supply sufficient to produce one ton of refrigeration in the Peltier unit. Each thermoelectric couple unit is comprised as one of a plural number of such units in a module 90 as shown generally in FIG. 5. In a particular embodiment, one hundred and eighty such modules 90 are required to produce the necessary electrical power supply associated with one ton of cooling. The respective modules 90 are disposed such that each thermocouple unit 92 therein has its hot side disposed at the interior of the duct 80 with its cold side disposed exterior of the same. In this fashion the hot products of combustion from the engine led through the duct 80 produce with the outside environment in the engine compartment a heat sink of considerable magnitude to thereby insure a large measure of thermoelectric potential production. Each module also includes a pair of wire leads 104 with which it can be connected electrically in series to others of such units.

Figure 4:
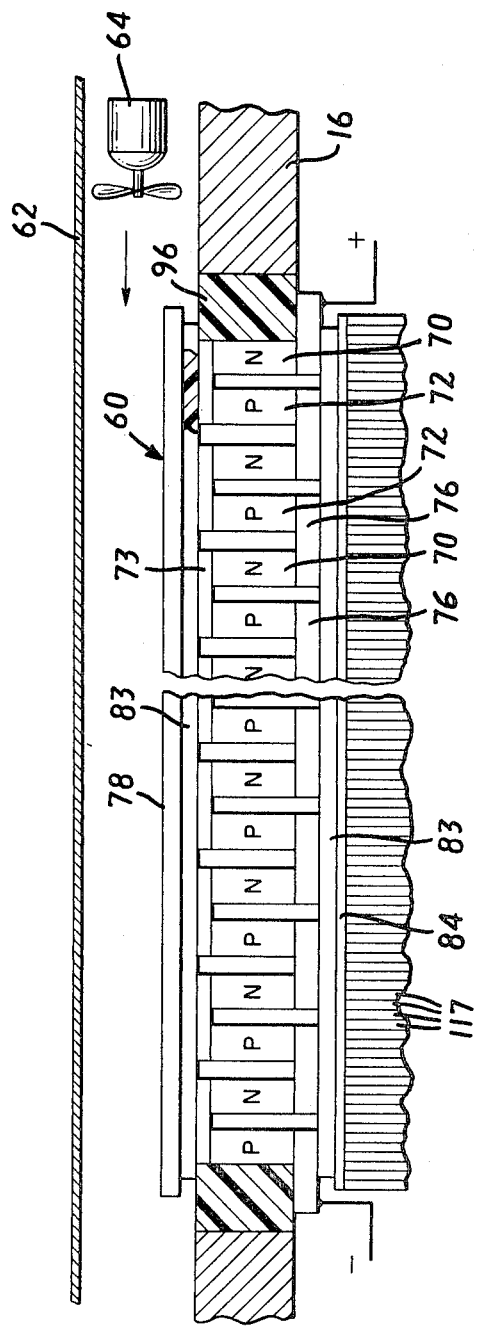
FIG. 4 is a horizontal sectional view on enlarged scale showing the positioning of the Peltier thermoelectric units in the firewall of the vehicle separating the passenger space and engine compartment.

The Peltier thermoelectric units can be the same type and number as the units 92 provided in the Seebeck generator device or they may be any other type suitable to the purpose as shown in FIG. 4. The Peltier units can be mounted in a frame or other suitable mounting which is received in the firewall 16 with the one junction of each of the thermoelectric units disposed within the passenger space and the other junction located in the engine compartment.

With the engine 16 operating and exhaust therefrom passing through conduit 69 and duct 80, the Seebeck generator device produces electrical power to supply the Peltier unit 60 which in turn employs the electrical current flow therethrough to effect removal of heat from or supply to passenger space 14 in the manner well-known as the Peltier effect and depending on the direction of current flow in unit 60. Thus, heat can flow from or to the junctions of the Peltier units in the passenger space to the junctions in the engine compartment. In the arrangement shown in FIG. 4, each Peltier thermoelectric unit includes a P type semi-conductor 72 and an N type semi-conductor 70, the semi-conductors having one junction provided by electrical conductor 73 and the other junction by electrical conductor 74. The respective junctions are connected through means of a high thermally conductive, low electrically conductive insulation 83 to a good thermally conductive plate or component 78 in the passenger space and a similar component 84 in the engine compartment. With current flow as depicted in FIG. 4, heat will flow from the junction 73 and to the junction 76 so that in such condition the unit provides air conditioning for the passenger space. To facilitate removal of heat from the hot junction 76, plate component 84 can be provided with fins 117. In mounting the unit in the firewall 16 suitable insulative mounting gasket means 96 can be employed. Air is circulated across such cold sides by means of fan 64 to circulate cooled air within the passenger space. To facilitate removal from the hot sides of the Peltier unit thermoelectric unit modules, either a fan 94 can be provided to provide air flow for carrying such heat away from the Peltier unit hot sides and dissipate same in the engine compartment or the unit can be provided with heat dissipation fins 117. In a like fashion heat produced at the cold sides of the Seebeck generator units can be carried off, and for this purpose the main fan 26 of the automobile engine can be used to supply air flow with suitable turning plates 98, 100 and like diverters being mounted on the Seebeck generator unit to insure adequate air flow across same.

For the purpose of providing the necessary quantity of thermoelectric couples for both the Peltier and Seebeck components, each modular unit 90 can be in one form, a 31 couple type module as amnufactured by Materials Electronic Corporation, such module containing 31 individual thermoelectric units or couples each comprised of a P and an N type semi-conductor material pellet. The 31 thermoelectric couples in each module are connected electrically in series and thermally in parallel with each module in turn being connected in like fashion.

Figure 6:
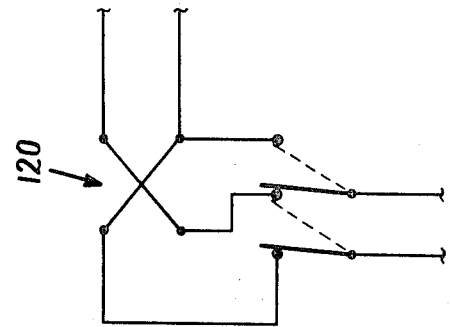
FIG. 6 is a schematic depiction of a switch used for reversing the polarity of the connection of the Seebeck generator with the Peltier units so that the same system can be used for heating purposes in the passenger space.

The system described above, in addition to being employed for air conditioning the passenger space of an automobile also can be used for heating the same in the winter season. For this purpose all that has to be done is to reverse the polarity of the current flow from the Seebeck generator to the Peltier unit so that the hot junctions of the latter will be located in the passenger space and the cold junctions will be located in the engine compartment. For this purpose a rotary switch unit 120 for reversing the polarity and located, e.g., in compartment 12 can be provided, such switch being shown schematically in FIG. 6 and comprising a double-pole double-throw switch, which in one position produces a current of a flow in one direction in the Peltier unit whereas in its other position an opposite current flow effect is produced. For controlling the changeover from heating to cooling and vice versa, a remote control rod 122 can be provided which device is accessible from the passenger space 14 for the purpose of selectively altering the switch position and consequently the polarity of the air conditioning system.

The above system has been described in terms of using semi-conductor materials in the Peltier and Seebeck units which have a Figure of Merit of approximately one. Such materials include lead and bismuth tellurides in N type materials as well as P type semiconductors which preferably are doped. If materials possessing a higher Figure of Merit are used, it would be possible to reduce the number of thermoelectric couple module units required in each of the Seebeck generator and Peltier units.

The invention also provides that the conduit 69 include a thermostatic valve 150 therein which when the engine 16 is not operating is closed. When the engine is started up the valve will open and permit products of combustion to flow to duct 80 as required for applying heat energy to the thermoelectric couples of the Seebeck generator.

While there is above disclosed only certain embodiments of the present invention it is possible to produce still other embodiments without departing from the scope of the inventive concept herein disclosed and accordingly it should be understood that all matter contained in the above description and accompanying drawings should be interpreted as illustrative and not in a limiting sense.

What is claimed is:

1. In an air conditioning system for a vehicle having a passenger space and an engine compartment isolated from said passenger space, an internal combustion engine in said compartment, an engine cooling system for removing heat from said engine during the operation thereof and comprising a source of water, means for circulating the water through said engine to transfer heat from the latter to the former, a radiator component through which heated water passes, and an air blower unit for blowing ambient air across said radiator to remove therewith heat from said water, said engine having an exhaust system including an exhaust manifold for carrying off heated products of combustion resulting from operation of said engine, said air conditioning system including, a plurality of thermoelectric units each comprised to two dissimilar semiconductors and having two junctions of said semiconductors, one of the junctions of each thermoelectric unit being disposed within said passenger space and other junction within said compartment, a thermoelectric generator device connected electrically with said thermoelectric units for producing and supplying DC current flow to said thermoelectric units whereby heat is caused to flow from one of the junctions of each unit to the other and vice-versa in correspondence with the direction of current flow in said units, and a fan unit in said passenger space for blowing air onto the junctions of said thermoelectric units disposed in said space and circulating same therein, the improvement of said generator device comprising a plurality of thermoelectric couples each comprised of two dissimilar semiconductors and having a hot side and a cold side, the hot sides of each being disposed interiorly of a common duct disposed in said compartment and carrying said thermoelectric couples, the cold sides being disposed exteriorly of said duct, said duct being connected by conduit means to said exhaust manifold for receiving heated products of combustion from said engine, said duct being disposed in said compartment in relation to said air blower unit such as to expose said cold sides to the air blown by said air blower unit for carrying heat therefrom.

2. The improvement in vehicle air conditioning systems of claim 1 in which said duct is provided as a structure supported on said radiator, said duct being elongated and having opposed sides, said thermoelectric couples being arranged on each of said opposed sides, there being provided further means for directing air flow from said air blower unit onto the cold sides of said thermoelectric couples at each of said opposed sides.

* * * * *